United States Patent
Vasekin et al.

(10) Patent No.: US 10,620,962 B2
(45) Date of Patent: Apr. 14, 2020

(54) APPRATUS AND METHOD FOR USING PREDICTED RESULT VALUES

(71) Applicant: Arm Limited, Cambridge (GB)

(72) Inventors: Vladimir Vasekin, Cambridge (GB); David Michael Bull, Cambridge (GB); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 100 days.

(21) Appl. No.: 16/025,116

(22) Filed: Jul. 2, 2018

(65) Prior Publication Data

US 2020/0004551 A1 Jan. 2, 2020

(51) Int. Cl.
*G06F 9/38* (2018.01)

(52) U.S. Cl.
CPC .......... *G06F 9/3855* (2013.01); *G06F 9/3838* (2013.01); *G06F 9/3861* (2013.01)

(58) Field of Classification Search
None
See application file for complete search history.

(56) References Cited

U.S. PATENT DOCUMENTS 5,878,244 A * 3/1999 Witt ................... G06F 9/30036
711/E12.075
5,941,983 A * 8/1999 Gupta ................... G06F 9/3836
712/214

(Continued)

OTHER PUBLICATIONS

Sodani, A. etal., Understanding the Differences Between Value Prediction and Instruction Reuse, IEEE, 11 pages. (Year: 1998).*

(Continued)

*Primary Examiner* — Eric Coleman
(74) *Attorney, Agent, or Firm* — Nixon & Vanderhye P.C.

(57) ABSTRACT

An apparatus and method are provided for using predicted result values. The apparatus has processing circuitry for executing a sequence of instructions, and value prediction storage that comprises a plurality of entries, where each entry is used to identify a predicted result value for an instruction allocated to that entry. Dispatch circuitry maintains a record of pending instructions awaiting execution by the processing circuitry, and selects pending instructions from the record for dispatch to the processing circuitry for execution. The dispatch circuitry is arranged to enable at least one pending instruction to be speculatively executed by the processing circuitry using as a source operand a predicted result value provided by the value prediction storage. Allocation circuitry is arranged to apply a default allocation policy to identify a first instruction to be allocated an entry in the value prediction storage. However, the allocation circuitry is further responsive to a trigger condition to identify a dependent instruction whose result value will be dependent on the result value produced by executing the first instruction, and to then allocate an entry in the value prediction storage to store a predicted result value for the identified dependent instruction. Such an approach can enable performance improvements to be achieved through the use of predicted result values even in situations where the prediction accuracy of the predicted result value for the first instruction proves not to be that high, by instead enabling a predicted result value for the dependent instruction to be used to allow speculative execution of further dependent instructions.

17 Claims, 9 Drawing Sheets

(56) References Cited

U.S. PATENT DOCUMENTS

| | | | | |
|---|---|---|---|---|
| 7,366,877 B2* | 4/2008 | Augsburg | ............ | G06F 9/3842 |
| | | | | 712/214 |
| 7,788,473 B1* | 8/2010 | Nelson | .................... | G06F 9/383 |
| | | | | 712/219 |
| 9,495,156 B1* | 11/2016 | Alexander | .......... | G06F 9/30021 |
| 2003/0110366 A1* | 6/2003 | Wu | ........................ | G06F 9/383 |
| | | | | 712/225 |
| 2004/0199752 A1* | 10/2004 | Winberg | ................ | G06F 9/383 |
| | | | | 712/225 |
| 2007/0266217 A1* | 11/2007 | Moyer | ................ | G06F 9/30043 |
| | | | | 711/170 |
| 2008/0052466 A1* | 2/2008 | Zulauf | ................ | G06F 12/0862 |
| | | | | 711/125 |
| 2014/0380022 A1* | 12/2014 | Troester | ................ | G06F 9/3826 |
| | | | | 712/216 |

OTHER PUBLICATIONS

Tanaka, Y. etal., Reducing the File Size through instruction Pre-Execution Enhanced by Value Prediction, IEEE, pp. 238-245. (Year: 2009).*

Calder., B. etal., Selective Value Prediction, IEEE., pp. 64-74. (Year: 1999).*

* cited by examiner

APPRATUS AND METHOD FOR USING PREDICTED RESULT VALUES

BACKGROUND

The present technique relates to an apparatus and method for using predicted result values.

A processing unit may comprise processing circuitry for executing a sequence of instructions, and often the processing circuitry is arranged in a pipelined arrangement, so that at any point in time a number of instructions can be in the process of being executed within the various stages of the pipeline. It is often the case that some instructions are dependent on the result of an earlier instruction, for example because they require as one of their source operands the result produced by that earlier instruction.

To seek to improve performance in such situations, it is known to provide value prediction circuitry that can maintain a predicted result value for one or more instructions, and typically the instructions chosen for this purpose are long latency instructions such as load instructions that miss in at least an initial level of cache. If a predicted result value is available for such an instruction forming the earlier instruction mentioned above, this would allow the processing circuitry to start execution of one or more dependent instructions, based on use of the predicted result value. Later it is then necessary to verify that the predicted result value did in fact match the actual result value produced when the earlier instruction was executed, and if the prediction is wrong, the processing circuitry will then need to re-execute the dependent instructions.

Such an approach can provide significant performance improvements provided that the predicted result values are accurate a significant proportion of the time. The performance benefits are particularly beneficial for long latency instructions, given the delay that is otherwise incurred before a dependent instruction dependent on the result of that long latency instruction can begin execution. However, for some long latency instructions it may not be possible to produce an accurate predicted result value. For example, considering load instructions, it may be difficult to produce a result value prediction in situations where there is no or little correlation between the data values loaded as a result of repeated execution of a particular load instruction, and in such instances the potential performance benefits of using value prediction have typically not been possible to realise.

SUMMARY

In one example configuration, there is provided an apparatus comprising: processing circuitry to execute a sequence of instructions; value prediction storage comprising a plurality of entries, each entry being used to identify a predicted result value for an instruction allocated to that entry; dispatch circuitry to maintain a record of pending instructions awaiting execution by the processing circuitry, and to select pending instructions from the record for dispatch to the processing circuitry for execution, the dispatch circuitry being arranged to enable at least one pending instruction to be speculatively executed by the processing circuitry using as a source operand a predicted result value provided by the value prediction storage; and allocation circuitry to apply a default allocation policy to identify a first instruction to be allocated an entry in the value prediction storage; the allocation circuitry being responsive to a trigger condition to identify a dependent instruction whose result value will be dependent on the result value produced by executing the first instruction, and to allocate an entry in the value prediction storage to store a predicted result value for the identified dependent instruction.

In another example configuration, there is provided a method of operating an apparatus having processing circuitry to execute a sequence of instructions, and value prediction storage comprising a plurality of entries, where each entry is used to identify a predicted result value for an instruction allocated to that entry, the method comprising: employing dispatch circuitry to maintain a record of pending instructions awaiting execution by the processing circuitry, and to select pending instructions from the record for dispatch to the processing circuitry for execution; causing the dispatch circuitry to dispatch at least one pending instruction for speculative execution by the processing circuitry using as a source operand a predicted result value provided by the value prediction storage; applying a default allocation policy to identify a first instruction to be allocated an entry in the value prediction storage; and responsive to a trigger condition, identifying a dependent instruction whose result value will be dependent on the result value produced by executing the first instruction, and allocating an entry in the value prediction storage to store a predicted result value for the identified dependent instruction.

In a yet further example configuration, there is provided an apparatus comprising: processing means for executing a sequence of instructions; value prediction storage means comprising a plurality of entries, each entry for identifying a predicted result value for an instruction allocated to that entry; dispatch means for maintaining a record of pending instructions awaiting execution by the processing means, and for selecting pending instructions from the record for dispatch to the processing means for execution, the dispatch means being arranged to enable at least one pending instruction to be speculatively executed by the processing means using as a source operand a predicted result value provided by the value prediction storage means; and allocation means for applying a default allocation policy to identify a first instruction to be allocated an entry in the value prediction storage means; the allocation means, responsive to a trigger condition, for identifying a dependent instruction whose result value will be dependent on the result value produced by executing the first instruction, and for allocating an entry in the value prediction storage means to store a predicted result value for the identified dependent instruction.

BRIEF DESCRIPTION OF THE DRAWINGS

The present technique will be described further, by way of example only, with reference to examples thereof as illustrated in the accompanying drawings, in which.

DESCRIPTION OF EXAMPLES

Figure 1:
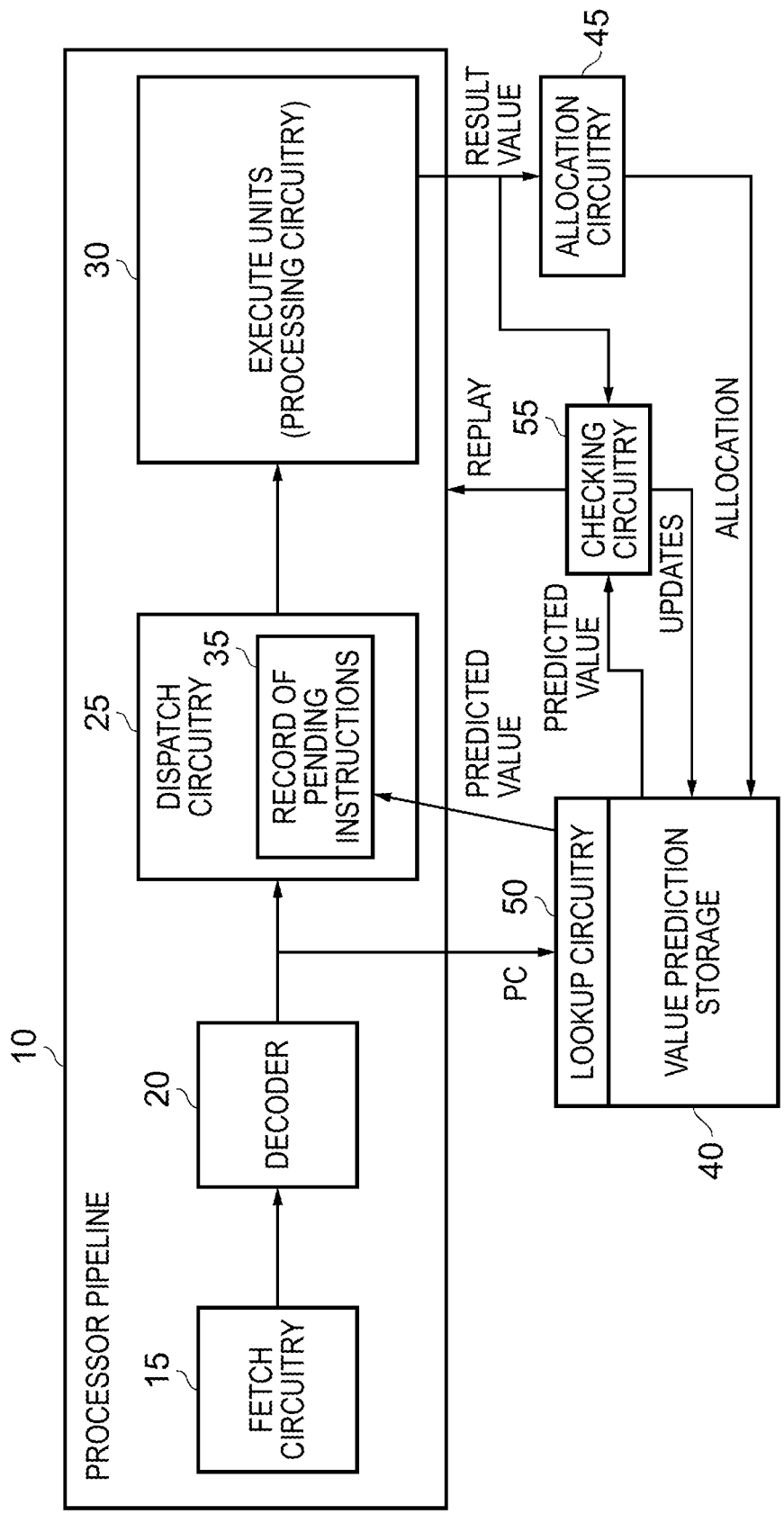
FIG. 1 is a block diagram of an apparatus in accordance with one example.

In one example configuration an apparatus is provided that has processing circuitry for executing a sequence of instructions, and value prediction storage that comprises a plurality of entries, where each entry is used to identify a predicted result value for an instruction allocated to that entry. Dispatch circuitry maintains a record of pending instructions awaiting execution by the processing circuitry, and is arranged to select pending instructions from the record to dispatch to the processing circuitry for execution. The dispatch circuitry is arranged to enable at least one pending instruction to be speculatively executed by the processing circuitry using as a source operand a predicted result value provided by the value prediction storage. This can enable a performance improvement to be achieved in situations where the predicted result value is correct. As mentioned earlier, once the actual result value is available, it can be verified whether the predicted result value did in fact match the actual result value, and if not it will then be necessary to re-execute the instructions that have been speculatively executed based on that predicted result value.

Allocation circuitry is used to apply a default allocation policy to identify a first instruction to be allocated an entry in the value prediction storage. However, in addition, the allocation circuitry is responsive to a trigger condition to identify a dependent instruction whose result value will be dependent on the result value produced by executing the first instruction, and in that instance is arranged to allocate an entry in the value prediction storage to store a predicted result value for the identified dependent instruction.

This can provide significant performance benefits in situations where the result value for the dependent instruction can be predicted more reliably than the result value for the first instruction, since in that instance it can be decided not to make a prediction of the result value for the first instruction, but instead to make a prediction for the result value of the identified dependent instruction, which then allows one or more instructions that are dependent on that dependent instruction to be speculatively executed by the processing circuitry, with a higher likelihood that the prediction proves to be correct, and accordingly there is no need to re-execute any instructions.

The default allocation policy can take a variety of forms, but in one example implementation is arranged to identify as the first instruction a latency incurring instruction where time taken to produce the result value exceeds a determined threshold. The latency incurring instruction can take a variety of forms, but in one example may be a load instruction that misses in at least one level of cache, or an instruction that requires a complex arithmetic operation, such as a divide instruction. Since such instructions may take a relatively long time to execute, and hence their result value will not be available for a significant number of cycles, it can be very useful to maintain predicted result values for such instructions. However, in some instances it is difficult to reliably predict the result value for such instructions.

However, the inventors have realised that in some instances it may be the case that a dependent instruction for such a long latency instruction in fact produces a result value that is easier to predict. Merely by way of example, consider a load instruction that loads a data value into a particular register and then a compare instruction that compares the data value stored in that register with a predetermined value, for example to check that the data value is different to that predetermined value. It may be the case that it can be predicted reliably that the comparison result will be that the stored data value does not match the predetermined value, and hence a reliable predicted result value for the compare instruction may be possible even in situations where accurately predicting the exact result value of the load instruction is not possible. In such instances, by being responsive to the trigger condition to populate an entry in the value prediction storage to maintain a predicted result value for the compare instruction, which is the dependent instruction for the load instruction that would be allocated in accordance with the default allocation policy, this can enable the instructions that are dependent on that compare instruction to be speculatively executed using the predicted result value for the compare instruction, where the predicted result value has a high degree of accuracy, and hence where significant performance benefits are likely to be realised by allowing those later pending instructions to be speculatively executed.

There may be a number of mechanisms provided to enable a check to be made as to whether the predicted result value maintained for a particular instruction in the value prediction storage is proven to be accurate or not. For example, in one implementation the apparatus may further comprise checking circuitry, responsive to execution by the processing circuitry of an instruction having an entry allocated in the value prediction storage, to check whether the generated result value matches the predicted result value. Further, at least the entry in the value prediction storage allocated for the first instruction may be arranged to maintain a misprediction indicator that is updated in dependence on the check performed by the checking circuitry each time the first instruction is executed.

There are a number of ways in which the misprediction indicator may be updated dependent on the outcome of the check performed by the checking circuitry. In one example implementation, when the checking circuitry detects that the generated result value does not match the predicted result value the misprediction indicator is adjusted to indicate a reduced likelihood of the predicted result value being correct, and when the checking circuitry detects that the generated result value does match the predicted result value the misprediction indicator is reset to an initial value. How the misprediction indicator is adjusted, and the form of the initial value, will vary dependent on how the misprediction indicator is implemented. However, purely by way of example, the misprediction indicator may be reset to an initial value of 0, and may be incremented by 1 each time the checking circuitry detects that the generated result value does not match the predicted result value, so that larger values of the misprediction indicator indicate a reduced likelihood of the predicted result value being correct.

The trigger condition can be detected in a variety of ways, but in one implementation the presence of the trigger condition is detected with reference to the current state of the misprediction indicator for one or more of the entries maintained in the value prediction storage. In particular, considering the entry maintained for the above-mentioned first instruction, which as mentioned earlier will typically be a latency incurring instruction, the trigger condition may be deemed to have occurred when the misprediction indicator associated with the first instruction indicates that accuracy of the predicted result value is below a chosen accuracy threshold. Hence, with reference to the misprediction indicator, a situation can be detected where the predicted result value for the first instruction is likely to prove unreliable, and in that instance the trigger condition may be raised to cause the allocation circuitry to seek to identify a dependent instruction that can then be allocated an entry in the value prediction storage.

There are a number of ways in which the allocation circuitry can be arranged to operate in response to the trigger condition. In one example, in response to the trigger condition the allocation circuitry is arranged, in addition to allocating an entry in the value prediction storage to store a predicted result value for the identified dependent instruction, to cause the entry that was allocated for the first instruction to be invalidated. Hence, in accordance with this implementation, the original entry that was allocated for the first instruction is effectively discarded, and instead an entry is made to store a predicted result value for the identified dependent instruction.

However, in an alternative arrangement, the value prediction storage may be arranged to maintain separate entries for the first instruction and the identified dependent instruction. In such an instance, this allows the value prediction storage to still, in principle, produce predicted result values for either the first instruction or the dependent instruction. For example, it may be the case that after an entry has been made for the identified dependent instruction, the accuracy associated with the predicted result value for the first instruction increases to a point where it becomes again reasonable to make predictions of the result value for the first instruction. Hence, in situations where the value prediction storage is not unduly space constrained, it may be reasonable to maintain entries for both the first instruction and the identified dependent instruction, rather than invalidating the entry for the first instruction when the entry for the identified dependent instruction is populated.

In implementations where separate entries are maintained for both the first instruction and the identified dependent instruction, the management of those two entries can in one implementation be performed entirely independently. However, in an alternative implementation, the value prediction storage may be arranged to maintain linking information to identify a link between the entry for the first instruction and the entry for the dependent instruction. The apparatus may then further comprise lookup circuitry to perform a lookup operation for a chosen instruction to determine whether the value prediction storage has an entry for the chosen instruction, the lookup circuitry being arranged when an entry is determined to be present for the chosen instruction and that entry contains linking information, to refer to information maintained for both the determined entry and the linked entry in order to decide whether the determined entry is to be used for providing a predicted result value to the dispatch circuitry.

By such an approach, this enables an additional check to be made when a hit is detected within the value prediction storage for the chosen instruction, to seek to ascertain whether it is appropriate to use the predicted result value for the chosen instruction or not, taking into account information maintained for the linked entry. For example, if that information indicates that the predicted result value for the linked entry is likely to have a higher degree of accuracy than the predicted result value for the entry associated with the chosen instruction, it may be decided not to make a prediction of the result value for the chosen instruction.

In one particular example, the information maintained for both the determined entry and the linked entry is a confidence indicator indicative of a confidence in accuracy of the predicted result value held in that entry, and the lookup circuitry is arranged to decide that the determined entry is to be used for providing a predicted result value to the dispatch circuitry when a comparison of the confidence indicator for the determined entry and the linked entry indicates a higher confidence as to the accuracy of the predicted result value held in the determined entry than the predicted result value held in the linked entry. It should be noted that whilst in this instance the determined entry is selected, there may be other considerations to take into account before deciding whether to actually use the predicted result value for that determined entry. For example, in some instances it can be arranged that the confidence indicator has to reach a certain level before the predicted result value is used. Hence, in such a case, not only does the confidence indicator for the determined entry need to be better than the confidence indicator for the linked entry, but also needs to indicate that a certain level of confidence in the accuracy of the predicted result value has been achieved.

In implementations where entries are linked in the manner described above, then additional steps may be required when an entry is invalidated. For example, when allocating an entry for a new instruction in the value prediction storage, it may be necessary to choose a victim entry whose current contents are to be overwritten, and those current contents may relate to an instruction that has the linking information set identifying a linked entry. When such an entry in the value prediction storage that has linking information is invalidated, then in one example implementation the linked entry is updated to remove the linking information within that linked entry, so that the linked entry effectively then becomes a standalone entry within the value prediction storage.

In implementations where each entry in the value prediction storage is arranged to maintain a confidence indicator indicating a confidence in the accuracy of the predicted result value stored in that entry, then that confidence indicator may be updated in dependence on the check performed by the earlier-mentioned checking circuitry each time the instruction allocated to that entry is executed.

In one example, when the checking circuitry detects that the generated result value matches the predicted result value the confidence indicator is adjusted to indicate a higher confidence in accuracy of the predicted result value, and when the checking circuitry detects that the generated result value does not match the predicted result value the confidence indicator is reset to an initial value. As with the earlier-mentioned misprediction indicator, how the confidence indicator is adjusted, and the form of the initial value that it is reset to, can vary dependent on the form of the confidence indicator. However, merely by way of example, the initial value of the confidence indicator could be 0 and the confidence indicator could be incremented each time it is detected that the generated result value matches the predicted result value, so that when the confidence indicator reaches a predetermined value, it is then determined that the predicted result value stored in that entry can be used for making predictions in respect of future instances of the instruction.

In one implementation, the confidence indicator and the misprediction indicator can be kept separately in different fields within the entry. However, if desired, in an alternative implementation the misprediction indicator may be maintained as part of the confidence indicator. In such an example implementation, the unitary indicator could be adjusted in a first direction when the checking circuitry detects that the generated result value matches the predicted result value, and in the opposite direction when the checking circuitry detects that the generated result value does not match the predicted result value, with positive and negative thresholds being associated with the value of the indicator to determine whether the level of confidence in the predicted result value is high enough to begin making predictions using that predicted result value, or whether the level of confidence has dropped to such an extent that the trigger condition is considered to be present.

In one example implementation, it is possible to continue to apply the above-described techniques in respect of dependent instructions allocated into the value prediction storage, such that a chain of dependency amongst a series of instructions can be followed until a point in the chain is reached where a result value can be predicted with a high enough degree of accuracy, enabling an entry to be made for that dependent instruction, to thereby enable speculative execution of one or more following dependent instructions. Hence, in one implementation, following allocation of an entry in the value prediction storage to store a predicted result value for the identified dependent instruction, the allocation circuitry is responsive to a further trigger condition to identify a second dependent instruction whose result value will be dependent on the result value produced by the identified dependent instruction, and to allocate an entry in the value prediction storage to store a predicted result value for the second dependent instruction. This process could then be repeated for one or more further dependent instructions, such that a third dependent instruction may be allocated an entry in the value prediction storage if the prediction accuracy of the predicted result value for the second dependent instruction drops below a certain level, etc.

Particular examples will now be described with reference to the Figures.

FIG. 1 is a block diagram of an apparatus in accordance with one example implementation. A processor pipeline 10 is shown comprising a number of components used to handle the execution of instructions. In particular, fetch circuitry 15 is provided for fetching instructions from a memory system for execution within the processor pipeline 10. The fetched instructions are then passed to a decoder 20 which decodes the instructions in order to produce control information used to control the execution of those instructions within an appropriate one of the execute units 30. The execute units 30 can be considered to form processing circuitry used to execute the instructions, and often the processing circuitry itself may consist of a number of pipelined stages, such that a number of instructions can be in the process of being executed within the various stages of the pipeline of the processing circuitry 30.

As shown, dispatch circuitry 25, which may also be referred to as issue circuitry, is provided for maintaining a record 35 of the pending instructions that are awaiting execution by the execute units 30. Hence, for each of the instructions decoded by the decoder 20, an entry may be maintained within the record 35 to identify information relating to that instruction. This information may identify for example the type of operation that is required to be performed, and an indication of the execute unit to which that instruction should be forwarded for execution, and will also maintain information about the source and destination operands for the instruction. Whilst in some instances one or more source operands may be specified as immediate values, it is often the case that the source operand values are specified with reference to a register within a register file accessible to the processor pipeline 10, that register file being omitted for simplicity in FIG. 1. The destination operand may also be specified by identifying a register to which the result value is to be written.

Once the source operands for a particular pending instruction are available, and assuming any other constraints on issuance of the instruction are met, then the dispatch circuitry 25 may select that instruction for forwarding to the appropriate execute unit of the processing circuitry 30, to cause that instruction to be executed.

It is often the case that some instructions are dependent on the result of an earlier instruction, for example because they require as one of their source operands the result produced by that earlier instruction. Hence, this may require a pending instruction within the record 35 that is dependent on the result to be produced by another instruction that has not yet completed execution within the processing circuitry 30, to have to await the result value of that earlier instruction to become available before it can then be selected by the dispatch circuitry for forwarding to the processing circuitry for execution. Where the earlier instruction is a long latency instruction, for example a load instruction where a miss occurs within at least a first level of cache, then there may be a significant number of clock cycles before the result value becomes available for the long latency instruction, which can incur a significant delay in the processing of the pending instruction, since it cannot be issued from the dispatch circuitry until the result value for the long latency instruction is available.

In order to seek to improve performance in such situations, value prediction storage 40 may be provided for maintaining a predicted result value for such long latency instructions. For example, the allocation circuitry 45 that manages allocation of instructions into the value prediction storage 40 may monitor the instructions being executed within the processing circuitry 30, and when a long latency instruction is observed, can then await the actual result value being produced, and at that point can allocate an entry into the value prediction storage to maintain information about that instruction, and the result value obtained when executing that instruction, so that that result value can in due course form a predicted result value for later occurrences of that instruction within the instruction sequence being executed by the processor pipeline 10. As will be discussed in more detail below, certain checking mechanisms may be implemented in relation to one or more future occurrences of the instruction to seek to determine an indication of the accuracy of the predicted result value before it is decided to begin using the predicted result value to influence the decisions taken by the dispatch circuitry 25 as to when instructions can be issued to the execution units 30 for execution.

As each decoded instruction is output from the decoder 20, the program counter value for that instruction can be forwarded to lookup circuitry 50 provided in association with the value prediction storage 40, the lookup circuitry using the program counter value to perform a lookup within the entries of the value prediction storage to determine whether the associated instruction has an entry within the value prediction storage. If it does, and provided any confidence requirement in relation to the predicted result value is met, then the predicted result value may be forwarded from the lookup circuitry 50 to the dispatch circuitry 25, where it can be used in association with the record of pending instructions 35. In one example implementation, a buffer can be provided in association with the dispatch circuitry to store such a forwarded predicted result value for subsequent use in association with dependent instructions. In particular, as the record of pending instructions is populated with one or more dependent instructions that require as a source operand the result value of the instruction that resulted in a hit in the value prediction storage, then the predicted result value can be used as that source operand rather than waiting for the actual result value to be produced. This means that for a dependent instruction that would otherwise be kept back in the record awaiting the actual result value, it can instead be dispatched earlier by the dispatch circuitry 25 for speculative execution within the execution units 30, using as the relevant source operand the predicted result value provided from the value prediction storage 40.

By allowing an earlier dispatch of such dependent instructions to the execute units 30, using as a source operand a predicted result value obtained from the value prediction storage 40, this can allow a significant increase in throughput of execution of instructions, provided that the predicted result value is accurate most of the time. In due course, since the dependent instructions will have been speculatively executed, a check needs to be made that the result value for the instruction that gave rise to the hit in the value prediction storage does actually match the predicted result value that was forwarded to the dispatch circuitry, and if it does not it is necessary to invoke a replay mechanism to restore the state of the processor pipeline 10 to the state it was in prior to the speculative execution of the dependent instructions, so that the dependent instructions can be re-executed using the actual result value. This check can be performed by the checking circuitry 55 shown in FIG. 1.

In particular, when a lookup performed by the lookup circuitry 50 produces a hit within the value prediction storage, then irrespective of whether the predicted result value is used or not at that stage, a signal will be issued to identify that the instruction does have an entry in the value prediction storage, and this information will be passed to the checking circuitry 55. When that instruction is subsequently executed, and the result value becomes available, the result value is forwarded to the checking circuitry 55, where it can compare the result value with the predicted value maintained in the relevant entry in the value prediction storage 40. If there is a match, then a confidence indication maintained in association with that entry can be adjusted to identify that there is an improved level of confidence in the accuracy of the predicted result value. Conversely if they do not match, then in one example implementation a misprediction indication maintained in association with the entry may be adjusted to identify that there is an increased likelihood that the predicted result value is inaccurate.

The way in which the confidence indication and misprediction indication are used will be discussed in more detail later with reference to the following figures. In addition, as will be discussed later, it is possible for an entry to maintain adjustment information in association with the predicted result value where regular patterns in the predicted result value are detected, such as if the predicted result value is incrementing or decrementing by a regular amount on each iteration of the instruction, so that that pattern can be taken into account when updating the predicted result value for the next occurrence of the instruction.

As a result, it will be appreciated that in dependence on the checks performed by the checking circuitry, one or more fields within the relevant entry of the value prediction storage may need to be updated, and that update information can be output from the checking circuitry 55 back to the value prediction storage 40 to cause update of the fields within the relevant entry of the value prediction storage. In a situation where the checking circuitry determines that the result value does not match the predicted result value, then a replay signal can be issued to the processor pipeline 10 to cause the state of the processor pipeline to be restored to the state that existed prior to the speculative execution of the dependent instructions, so as to allow the dependent instructions to be re-executed using the actual result value. It will be appreciated that this step is only necessary where a predicted result value was actually used, and accordingly one or more dependent instructions have been speculatively executed. However, as discussed earlier, even in instances where a predicted result value is not used (for example because the confidence as to its accuracy has not yet reached a threshold level), the checking circuitry may still perform checks of the result value against the predicted result value to enable the contents of the entry to be updated dependent on that check, for example to update the earlier-mentioned confidence indication, misprediction indication, or adjustment information used to alter the predicted result value.

It will be appreciated that the components illustrated within the processor pipeline 10 are schematic, and there will be typically be a number of other components provided within the processor pipeline, for example prediction circuitry used to influence the instructions fetched by the fetch circuitry 15, rename circuitry used to map architectural registers to physical registers of the register file, in situations where register renaming is used to facilitate out-of-order execution of instructions, etc.

Figure 2:
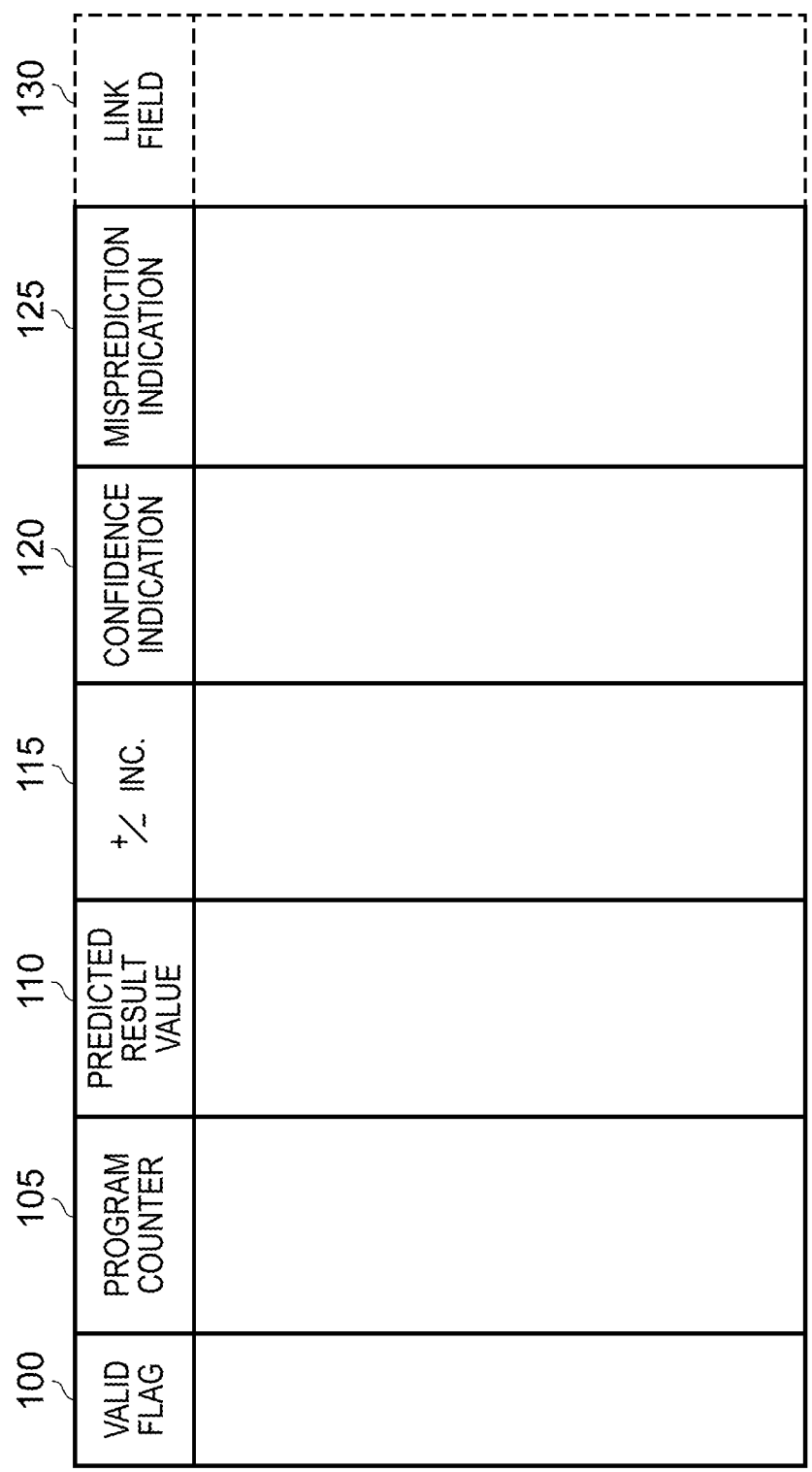
FIG. 2 illustrates the fields provided within the entries of the value prediction storage of FIG. 1 in accordance with one example.

FIG. 2 is a diagram illustrating fields that may be provided within each entry of the value prediction storage 40 in one example implementation. A valid flag 100 is used to indicate whether a particular entry is currently considered to store valid information or not, and when the lookup circuitry 50 performs a lookup within the value prediction storage, it will only be able to obtain a hit in respect of an entry that is marked as valid.

Field 105 is provided for storing a program counter value identifying the instruction to which the entry relates, and the lookup circuitry 50 compares the program counter information 105 within each entry with the program counter forwarded from the decoder 20 in order to determine whether an entry exists for the decoded instruction.

A field 110 provides a predicted result value for the instruction, whilst a field 115 can provide adjustment information, for example a positive or negative increment amount, that can be used to adjust the predicted result value following each occurrence of the instruction.

Field 120 maintains a confidence indication indicative of the confidence as to the accuracy of the predicted result value in the field 110, and when the confidence indication reaches a predetermined threshold level, this is used to identify that the predicted result value can now be used. Accordingly when a hit occurs within an entry whose confidence indication indicates that the accuracy has reached that threshold level, then the predicted result value in the field 110 can be output to the dispatch circuitry 25.

The misprediction indication 125 is used to indicate a level of misprediction observed in relation to the predicted result value. In the examples described herein, it is this information that is used to detect occurrence of the trigger condition, which causes the allocation circuitry to deviate from its default allocation policy of allocating entries for long latency instructions, and instead to seek to detect a dependent instruction for the instruction whose misprediction indication indicates a low level of accuracy in the predicted result value, with an entry then being allocated into the value prediction storage for that dependent instruction. A predicted result value will then be determined for that dependent instruction, and when that predicted result value is shown to exceed a required level of confidence as to its accuracy, then subsequent occurrences of that dependent instruction can give rise to a predicted result value being output to the dispatch circuitry 25, allowing further dependent instructions that are dependent on that dependent instruction to then be speculatively executed using the predicted result value. This can be very useful in situations where the original instruction that was allocated an entry is such that the predicted result value proves not to be particularly accurate. In particular, it may be the case that the predicted result value for the dependent instruction can still be predicted with accuracy even though an accurate prediction cannot be made for the original instruction, and accordingly the benefits of speculative execution of dependent instructions can still be realised, using the predicted result value for the dependent instruction.

When the level of misprediction in association with a particular entry reaches the threshold level, as indicated by the misprediction indication 125, and accordingly causes another entry to be allocated for a dependent instruction, then in one example the original entry may be invalidated by clearing the valid flag 100. However, alternatively it may be decided to allow both entries to continue to exist within the value prediction storage 40. Whilst those entries may be maintained entirely independently, in one example implementation a link field 130 can be provided in association with the entries, allowing both the original entry and the entry made for a dependent instruction to be marked as linked, and this can be referred to when the lookup circuitry is performing lookup operations in order to influence the decision as to whether to provide a predicted result value for the instruction that results in a hit in the value prediction storage, as will be discussed in more detail later with reference to FIG. 8.

Figure 3:
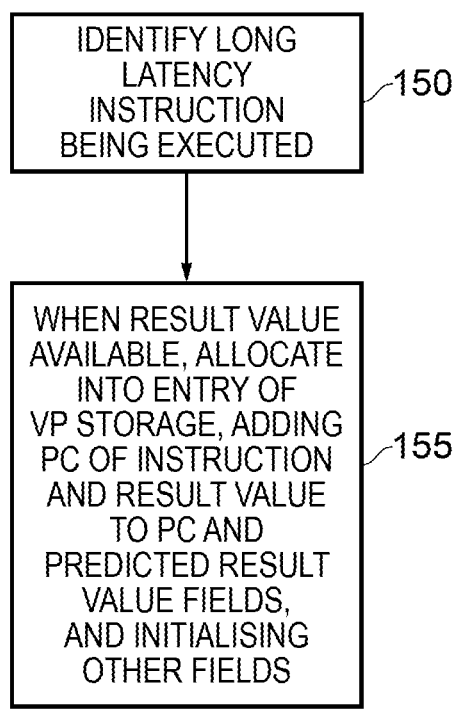
FIG. 3 is a flow diagram illustrating the default operation of the allocation circuitry in accordance with one example.

FIG. 3 is a flow diagram illustrating the default operation of the allocation circuitry 45 of FIG. 1. At step 150, a long latency instruction that is being executed is identified. There are a number of ways in which such a long latency instruction may be identified. For example, considering load instructions, these are typically processed by performing a lookup within an initial level of cache, and if a hit is detected the data value can be returned directly from that level of cache. However, if a miss occurs then the load request will need to be propagated onto one or more lower levels of cache and/or main memory, and at that point a significant latency can be incurred before the result value is available. If performance of a load operation is detected where a miss has occurred in the highest level of cache, then the allocation circuitry may identify that instruction at step 150. Similarly, certain types of instruction may be known to incur a relatively long latency due to the complex sequence of operations required to process those instructions. One example may be a divide instruction, and accordingly the allocation circuitry can detect situations where such an instruction is being executed at step 150.

Once a long latency instruction has been identified at step 150, then at step 155 the allocation circuitry awaits the result value becoming available. Once the result value is available, then an entry is allocated into the value prediction storage, adding the program counter of the instruction and the result value to the program counter and predicted result value fields 105, 110. In addition, the valid flag 100 will be set to identify that the entry is valid, and the other fields will typically be initialised to initial values.

Figure 4:
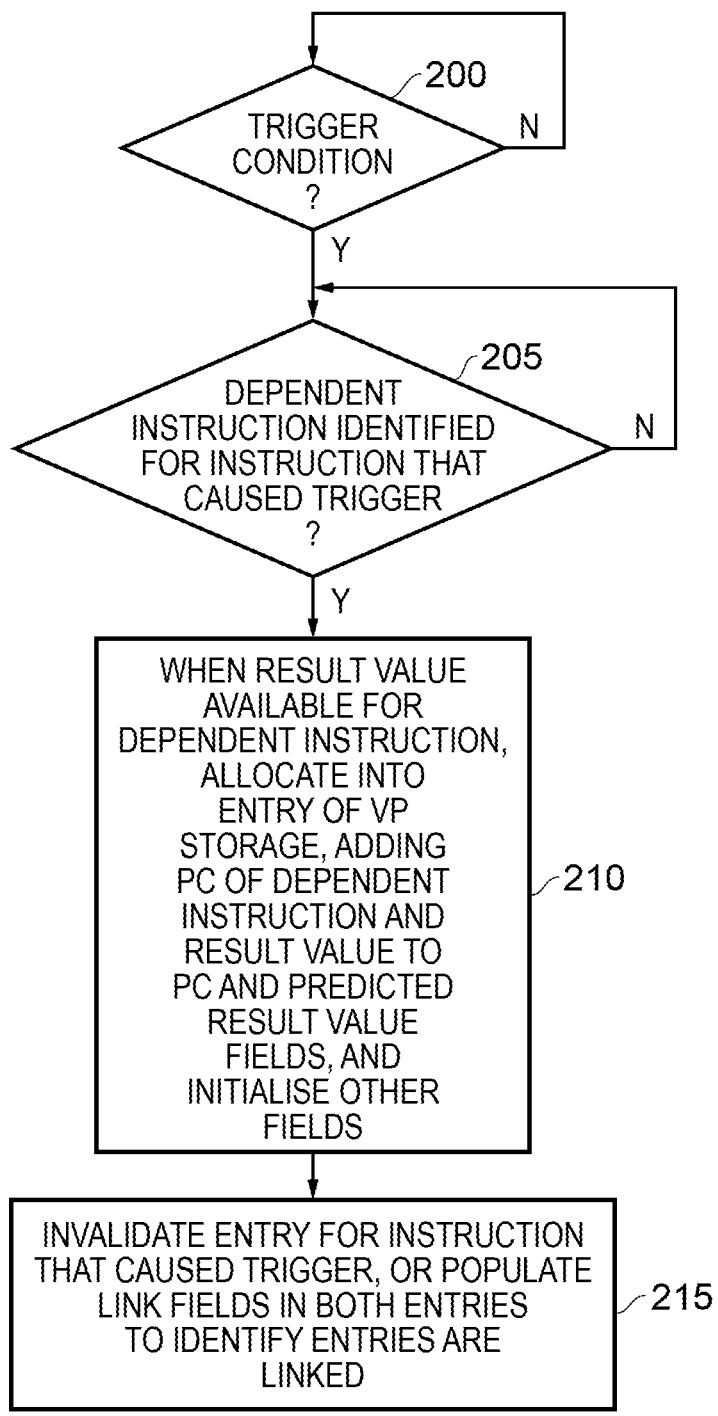
FIG. 4 is a flow diagram illustrating an additional allocation process that may occur upon occurrence of a trigger condition in accordance with one example.
Figure 7:
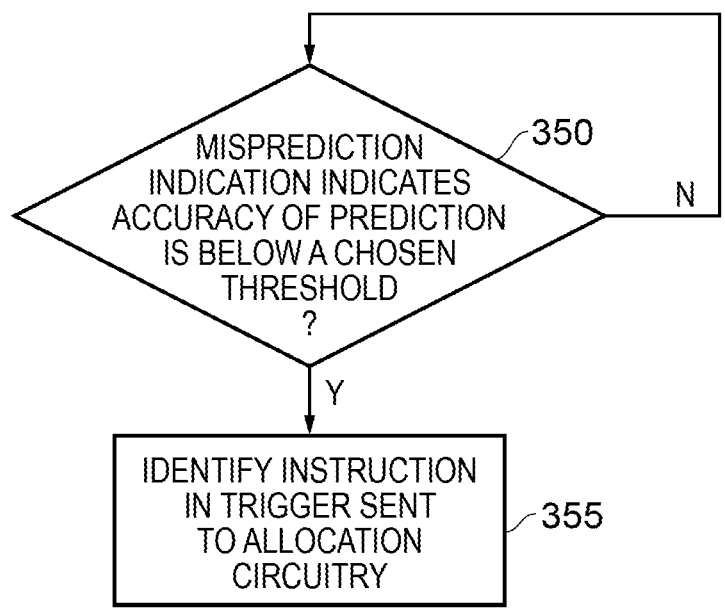
FIG. 7 illustrates a monitoring process that may be implemented in one example in relation to the misprediction indications maintained within the value prediction storage.

FIG. 4 is a flow diagram illustrating an additional allocation that may be performed by the allocation circuitry 45 upon detection of the trigger condition. At step 200, it is determined whether the trigger condition is present or not. In the examples described herein, the misprediction indication information 125 maintained for each entry is used for this purpose. In particular, when for a particular entry the misprediction indication reaches a certain threshold, indicating that the accuracy of the predicted result value is below a certain level, then this is used to indicate the presence of the trigger condition for the instruction identified by that entry. This process is illustrated in FIG. 7 which discloses a monitoring process employed in respect of the value prediction storage 40, and in particular in relation to the misprediction indication information 125 maintained in each of the entries. If at step 350 the misprediction indication for a particular entry indicates that the accuracy of prediction is below a chosen threshold, then the process proceeds to step 355 where that instruction is identified in a trigger sent to the allocation circuitry 45.

It should be noted that whilst the misprediction indication information could in one example implementation only be maintained for the originally allocated long latency instructions, it can alternatively be maintained for every instruction allocated an entry in the value prediction storage. Hence the instruction whose misprediction indicates that the accuracy of prediction is below a chosen threshold may not only be an original long latency instruction, but could also be a dependent instruction that has been allocated due to the original long latency instruction having had a prediction accuracy that dropped below the chosen threshold. Hence, by such an approach, it is possible to follow a chain of dependency and to allocate entries for further dependent instructions that are themselves dependent on the result produced by a dependent instruction already allocated into the value prediction storage 40.

Returning to FIG. 4, once the trigger condition is detected at step 200, the allocation circuitry then determines whether a dependent instruction can be identified for the instruction that caused the trigger. Typically there will be at least one dependent instruction that can be identified at this point, since it is often the case that the results produced by instructions are then consumed as source operands by subsequent instructions. Hence, the yes path from step 205 will typically be followed, and the no path merely indicates a waiting step until the dependent instruction is found. However, on the rare occasion where there is no dependent instruction, then the process could merely end following step 205.

Once a dependent instruction has been identified at step 205, then at step 210 the result value is awaited for that dependent instruction. When the result value is available, then the allocation circuitry will allocate an entry within the value prediction storage to store the information about that dependent instruction. Accordingly, the program counter of the dependent instruction and the result value will be added to the program counter and predicted result value fields 105, 110 of the allocated entry, and the valid flag 100 will be set to identify that the entry is valid. All of the other fields will typically be initialised to initial values.

At step 215, then the entry for the instruction that caused the original trigger at step 200 could if desired be invalidated. This may be a suitable step to take in situations where the number of entries within the value prediction storage is particularly constrained. However, if desired, both entries could continue to be maintained. In one example this may merely involve maintaining the two entries entirely independently, and allowing predictions to be made based on either entry. However, in one example implementation, the link fields 130 of the two linked entries are populated to identify that those entries are linked. In particular, the link field for one entry will maintain sufficient information to enable the other entry to be identified.

Figure 5:
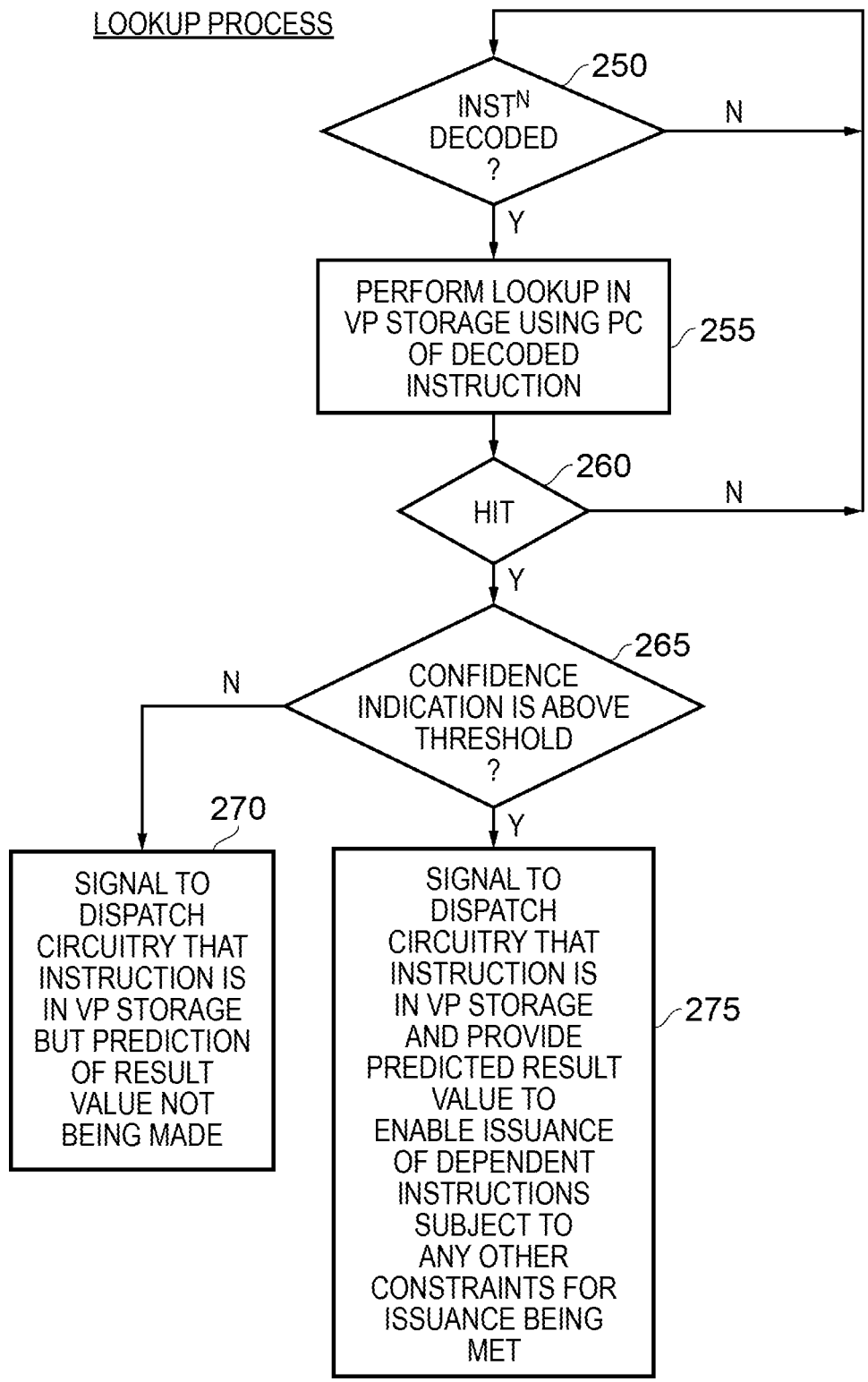
FIG. 5 is a flow diagram illustrating the lookup process within the value prediction storage in accordance with one example.

FIG. 5 is a flow diagram illustrating the lookup process performed by the lookup circuitry 50 in one example. At step 250, the process waits for an instruction to be decoded by the decoder 20, and thereafter at step 255, the lookup circuitry 50 performs a lookup in the value prediction storage 40 using the program counter value provided for the decoded instruction. At step 260 it is determined whether a hit occurs within the value prediction storage 40, i.e. whether a valid entry is detected for the program counter in question. If not, the process merely returns to step 250 to await the next decoded instruction.

However, assuming a hit is detected, then it is determined whether the confidence indication maintained within the hit entry is above a predetermined threshold, indicating that there is a suitable degree of confidence in the accuracy of the predicted value to use the predicted result value to allow early speculative execution of one or more dependent instructions. If not, the process proceeds to step 270, where a signal is sent to the dispatch circuitry to indicate that the instruction does have a valid entry in the value prediction storage but that a prediction of the result value is not being made. That information can then be passed through the processor pipeline as the instruction is subsequently executed, allowing the checking circuitry 55 to perform the earlier described checks once the result value is available for the execution of the instruction.

However, if the confidence indication is above the threshold, then at step 275 a signal is issued to the dispatch circuitry 25 to identify that the instruction does have an entry in the value prediction storage 40, and in addition the predicted result value is provided to enable issuance of any dependent instructions, subject to any other constraints for issuance being met. As a result, one or more dependent instructions may be dispatched to the execute units 30 for speculative execution using the predicted result value as a source operand. In due course, a check can then be made as to whether the predicted result value is in fact the same as the result value that is subsequently produced when executing the instruction that resulted in a hit at step 260 within the value prediction storage 40.

Figure 6:
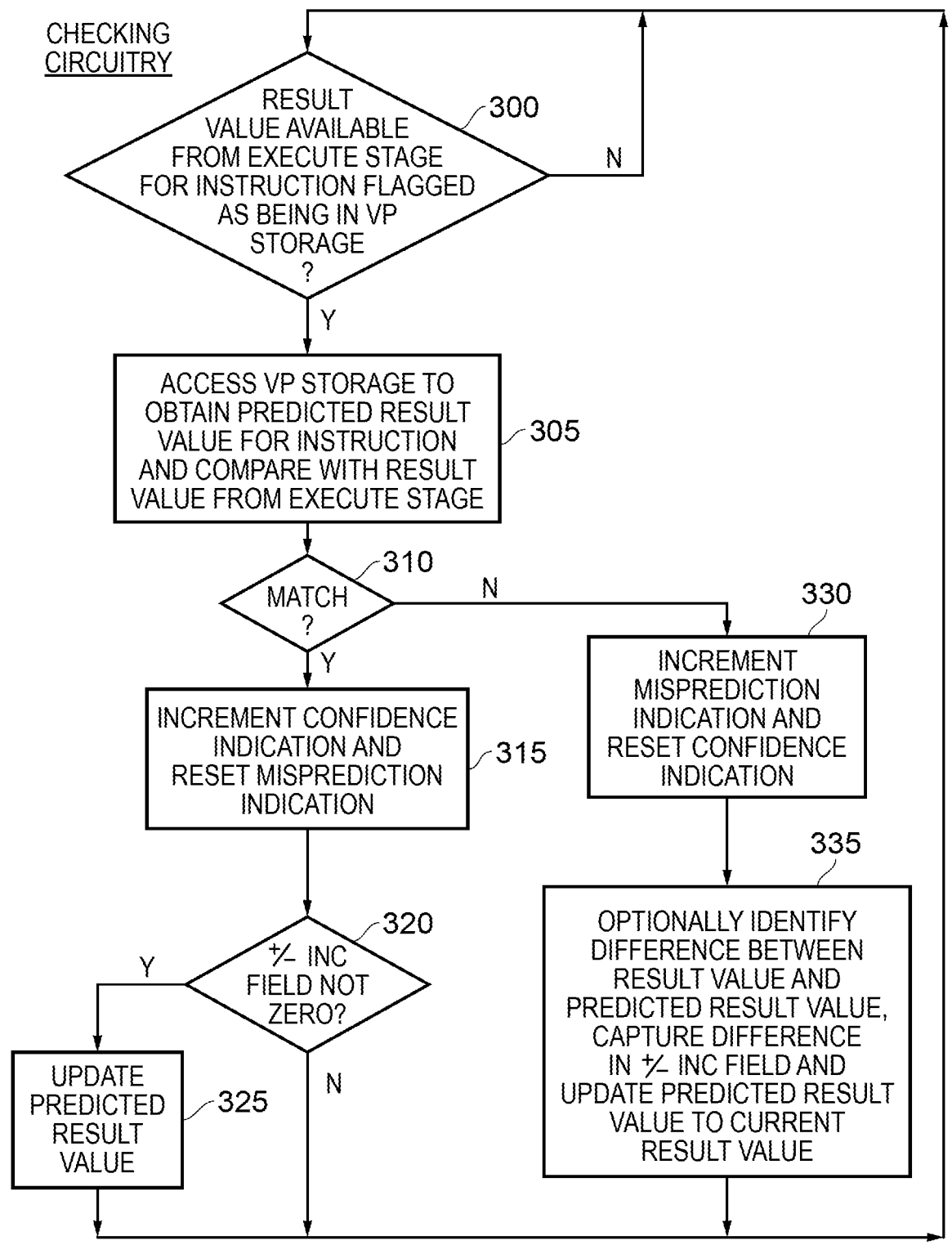
FIG. 6 is a flow diagram illustrating the operation of the checking circuitry of FIG. 1 in accordance with one example.

FIG. 6 is a flow diagram illustrating the operation of the checking circuitry 55 of FIG. 1 in one example implementation. At step 300, the checking circuitry awaits a result value being available from the processing circuitry 30 for an instruction that has been flagged as having a valid entry associated with it in the value prediction storage 40. This information will be available by virtue of the signal issued from the lookup circuitry 50 at either step 270 or step 275 of FIG. 5 following a hit being detected within the value prediction storage.

Once the result value is available, then the checking circuitry 55 is arranged at step 305 to access the value prediction storage in order to obtain from the relevant entry the predicted result value for the instruction, and is then arranged to compare that result value with the result value obtained from the processing circuitry. At step 310 it is determined whether there is a match, and if so at step 315 the confidence indication maintained within the field 120 is incremented, whilst the misprediction indication maintained within the field 125 is reset to its initial value. In one example implementation, both the confidence indication and the misprediction indication are reset to a logic 0 value, and are then incremented as appropriate dependent on the match detected at step 310. In particular, as indicated at step 315, the confidence indication is incremented when there is a match. Conversely if no match is detected at step 310 then the mispredict indication is incremented at step 330, and instead it is the confidence indication that is reset.

It has been found to be useful to maintain separate confidence indications and mispredict indications whose values are manipulated as shown in steps 315 and 330. However, in an alternative embodiment, a single indication may be maintained, which may for example be incremented in the presence of a match and decremented when it is determined that the result value and the predicted result value do not match. If that unitary indication reaches a certain positive threshold value, this will indicate that the confidence is high enough to allow the predicted result value to start to be used to allow speculative execution of dependent instructions. Conversely, if the unitary indication reaches a threshold negative value, this may be used to indicate the trigger condition, so as to cause the allocation circuitry to seek to allocate an entry for a dependent instruction.

However, considering the arrangement shown in FIG. 6 where separate confidence indications and mispredict indications are maintained, then following step 315, it may be determined at step 320 whether the adjustment field 115 is non-zero. If a logic 0 value is held within that field, then this indicates that there is no detected adjustment pattern between consecutive result values, and accordingly no further action needs to be taken and the process returns to step 300. However, if the adjustment field is non-zero, for example indicating a positive or a negative increment, then that information can be used at step 325 to update the predicted result value held within the field 110, prior to returning to step 300. This for example means that if there is a regular pattern of adjustment between the result value on each iteration of execution of a particular instruction, the predicted result value can be updated to reflect that, so as to assist in a match being detected at step 310 when the instruction is subsequently re-executed.

It will however be appreciated that steps 320, 325 merely illustrate one example way in which a pattern of regular adjustment may be identified and acted upon within the value prediction storage 40, and it will be appreciated that other techniques could also be used for managing and using such information.

If a match was not detected at step 310, and accordingly the process proceeded via step 330, then once the mispredict indication has been incremented and the confidence indication has been reset, at step 335 an optional step that may be taken is to identify the difference between the result value and the predicted result value, and to capture that difference in the adjustment field 115. In addition, the predicted result value may be updated to the current result value that was received at step 300. Again, it will be appreciated that step 335 is merely one example way in which a regular pattern of adjustment that is detected may be managed when maintaining the information in the value prediction storage 40. Following step 335, the process returns to step 300.

Figure 8:
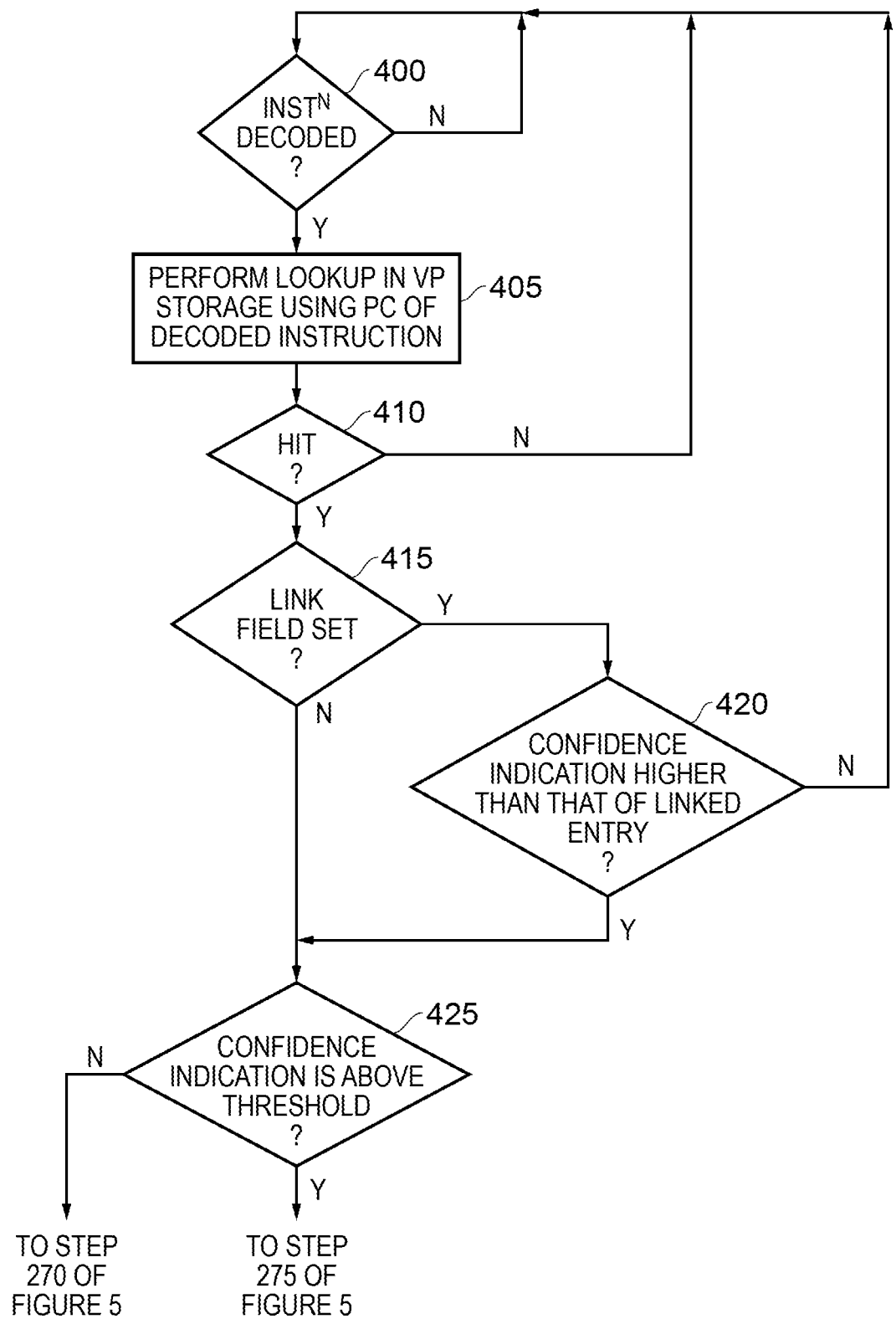
FIG. 8 is a flow diagram illustrating a modified lookup process employed in one example implementation where the link field shown in FIG. 2 is used.

As mentioned earlier with reference to FIG. 2, a link field 130 may be used in one example implementation, to allow a linking to be maintained between an entry for an original instruction, and a subsequent entry made for a dependent instruction when the misprediction indication in association with the original instruction indicated that the confidence in the predicted result value was below a certain threshold level. FIG. 8 is a flow diagram illustrating how the earlier described lookup process of FIG. 5 may be modified in the event that such a link field is used. Steps 400, 405 and 410 correspond to steps 250, 255 and 260 of the earlier-described FIG. 5. If a hit is detected at 410, then at step 415 it is determined whether the link field for the hit entry is set, i.e. maintains information identifying another entry that is linked with that entry. If not, the process proceeds to step 425 which corresponds to the earlier-described step 265 of FIG. 5. As a result, if the confidence indication is not above the threshold, then the process proceeds to step 270 of FIG. 5, whilst if the confidence indication is determined to be above the threshold at step 425, the process proceeds to step 275 of FIG. 5.

However, if at step 415 it is determined that the link field is set, then the process proceeds to step 420, where it is determined whether the confidence indication for the current hit entry is higher than the confidence indication maintained in association with the linked entry. Only if it is does the process proceed to step 425, and otherwise the process merely returns to step 400 to await the next decoded instruction. Hence, in effect, it will be appreciated that in situations where the confidence indication in the hit entry is lower than that of the confidence indication in the linked entry, the hit entry is treated as though no hit has been detected.

It will be appreciated that the path followed from step 420 in the event that both linked entries have the same confidence indication can be varied dependent on implementation. In one example implementation, if the confidence indications are the same in both entries, then the process will proceed as though a hit has been detected, and accordingly the "yes" path will be followed to step 425.

Hence, in summary, it can be seen that through the use of the link field information, a form of tournament prediction is implemented between the two linked entries, so that at any point in time one of those entries will be used to give rise to hit conditions, and hence the potential use of the associated predicted result value provided the confidence indication is above a certain threshold. By such an approach, the overall prediction accuracy of the value prediction storage 40 can be increased, since it can be determined dynamically which of the two entries holds the most accurate prediction, and that information used to influence when to issue predicted result values to the dispatch circuitry. In particular, if the dependent instruction holds a more accurate predicted result value than the predicted result value maintained for the original instruction, then it may be decided not to output a predicted result value when the original instruction is encountered, but instead to output a predicted result value for the dependent instruction when that dependent instruction is encountered. As a result, the dispatch circuitry can then speculatively execute further dependent instructions dependent on the dependent instruction for which the predicted result value is provided, with a higher likelihood that the speculative execution will not need to be replayed than would have been the situation had the predicted result value for the original instruction been used to initiate the speculative execution.

Figure 9:
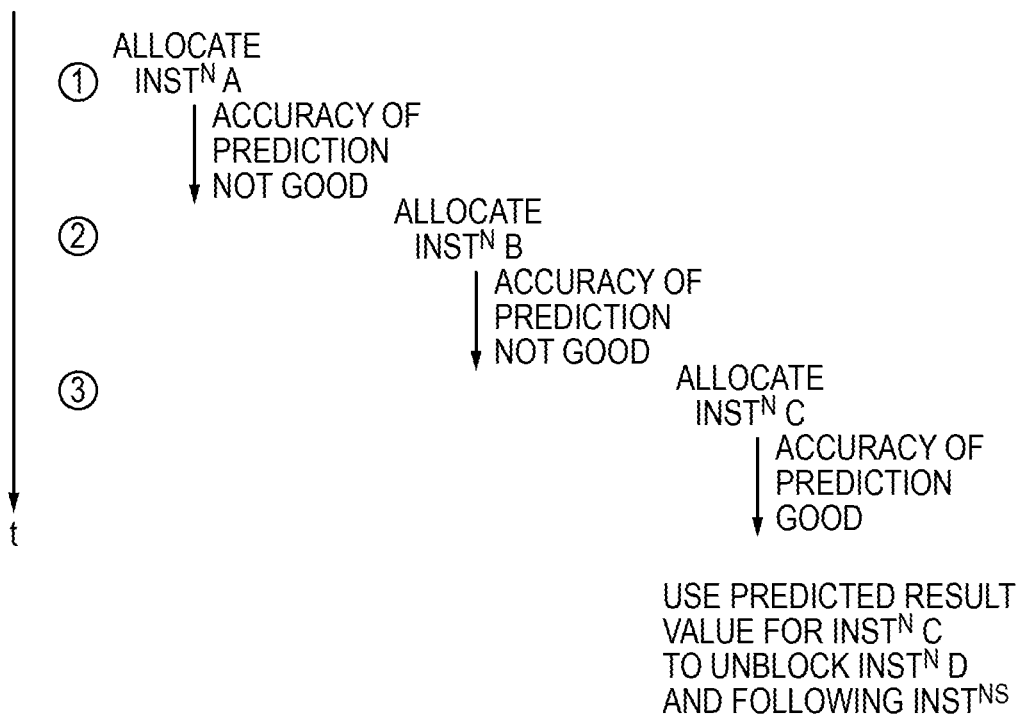
FIG. 9 is a diagram schematically illustrating how the technique described herein can be used to predict the values of several instructions in a chain of dependency, and unlock the tail portion of the chain from a point where a reliable prediction can be made.

The above described process can be used to predict the result values in a chain of dependency, as illustrated schematically in FIG. 9. In this example, it is assumed that instruction A is a long latency instruction, and as result of the default allocation policy applied by the allocation circuitry 45, an entry will be made in the value prediction storage 40 to seek to predict the result value for that long latency instruction. As shown in FIG. 9, there is a chain of dependency stemming from Instruction A. In particular, Instruction B is dependent on Instruction A, Instruction C is dependent on Instruction B, and Instruction D is dependent on Instruction C.

As illustrated in FIG. 9, at time 1, an entry is allocated in the value prediction storage for Instruction A, but over time, through the earlier-described actions of the checking circuitry as subsequent iterations of Instruction A are encountered, the misprediction indication is incremented to a point where it is determined that the accuracy of the prediction being made in respect of instruction A is unacceptable. At this point, the trigger condition is detected causing identification of instruction B as a dependent instruction, and the allocation of an entry in the value prediction storage at time 2 to maintain a predicted result value for the result of Instruction B.

Over subsequent iterations of Instruction B, as shown in FIG. 9 it is determined that the accuracy of the prediction of the result value for Instruction B also falls below a desired level, and this causes occurrence of the trigger condition again at time 3, as a result of which Instruction C is identified as a further dependent instruction, and an entry is made in the value prediction storage 40 to maintain a predicted result value for Instruction C. Over time, it is determined that the accuracy of the prediction of the result value for Instruction C is acceptably good, which in the example of FIG. 2 will be captured by virtue of the confidence indication incrementing to a value that reaches that a predetermined threshold value. At this point, the predicted result value for Instruction C will be used subsequently when seeking to unblock instructions being held within the record 35, and in particular will allow Instruction D and one or more following instructions to be speculatively executed by using as one of the source operands for Instruction D the predicted result value for Instruction C.

It will be appreciated that this provides a very flexible mechanism for seeking to determine the most appropriate instruction for which to reliably provide predicted result values, in order to seek to increase the throughput of instruction execution within the processor pipeline 10.

In accordance with the described examples, the allocation of entries into the value prediction storage can by default be arranged to favour allocation of long latency instructions, but in situations where the prediction accuracy of the result value for such long latency instructions is proving unreliable, it is possible to then allocate entries for one or more dependent instructions, and identify situations where the prediction accuracy of the result values for such dependent instructions is actually higher than the prediction accuracy for the originally allocated long latency instruction. By such an approach, the overall prediction accuracy of the value prediction storage 40 can be improved, enabling an increase in the performance benefits to be realised from the use of the predicted result values from the value prediction storage 40, by reducing the number of situations where it becomes necessary to replay speculatively executed instructions executed on the basis of such predicted result values.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute a sequence of instructions;
value prediction storage comprising a plurality of entries, each entry being used to identify a predicted result value for an instruction allocated to that entry;
dispatch circuitry to maintain a record of pending instructions awaiting execution by the processing circuitry, and to select pending instructions from the record for dispatch to the processing circuitry for execution, the dispatch circuitry being arranged to enable at least one pending instruction to be speculatively executed by the processing circuitry using as a source operand a predicted result value provided by the value prediction storage; and
allocation circuitry to apply a default allocation policy to identify a first instruction to be allocated an entry in the value prediction storage;
the allocation circuitry being responsive to a trigger condition to identify a dependent instruction whose result value will be dependent on the result value produced by executing the first instruction, and to allocate an entry in the value prediction storage to store a predicted result value for the identified dependent instruction.

2. An apparatus as claimed in claim 1, wherein the default allocation policy is arranged to identify as the first instruction a latency incurring instruction where a time taken to produce the result value exceeds a determined threshold.

3. An apparatus as claimed in claim 1, further comprising:
checking circuitry, responsive to execution by the processing circuitry of an instruction having an entry allocated in the value prediction storage, to check whether the generated result value matches the predicted result value; and
wherein at least the entry in the value prediction storage allocated for the first instruction is arranged to maintain a misprediction indicator that is updated in dependence on the check performed by the checking circuitry each time the first instruction is executed.

4. An apparatus as claimed in claim 3, wherein when the checking circuitry detects that the generated result value does not match the predicted result value the misprediction indicator is adjusted to indicate a reduced likelihood of the predicted result value being correct, and when the checking circuitry detects that the generated result value does match the predicted result value the misprediction indicator is reset to an initial value.

5. An apparatus as claimed in claim 3, wherein the trigger condition occurs when the misprediction indicator associated with the first instruction indicates that accuracy of the predicted result value is below a chosen accuracy threshold.

6. An apparatus as claimed in claim 1, wherein in response to the trigger condition the allocation circuitry is arranged, in addition to allocating an entry in the value prediction storage to store a predicted result value for the identified dependent instruction, to cause the entry that was allocated for the first instruction to be invalidated.

7. An apparatus as claimed in claim 1, wherein the value prediction storage is arranged to maintain separate entries for the first instruction and the identified dependent instruction.

8. An apparatus as claimed in claim 7, wherein:
the value prediction storage is arranged to maintain linking information to identify a link between the entry for the first instruction and the entry for the dependent instruction;
the apparatus further comprising:
lookup circuitry to perform a lookup operation for a chosen instruction to determine whether the value prediction storage has an entry for the chosen instruction, the lookup circuitry being arranged when an entry is determined to be present for the chosen instruction and that entry contains linking information, to refer to information maintained for both the determined entry and the linked entry in order to decide whether the determined entry is to be used for providing a predicted result value to the dispatch circuitry.

9. An apparatus as claimed in claim 8, wherein the information maintained for both the determined entry and the linked entry is a confidence indicator indicative of a confidence in accuracy of the predicted result value held in that entry, and the lookup circuitry is arranged to decide that the determined entry is to be used for providing a predicted result value to the dispatch circuitry when a comparison of the confidence indicator for the determined entry and the linked entry indicates a higher confidence as to the accuracy of the predicted result value held in the determined entry than the predicted result value held in the linked entry.

10. An apparatus as claimed in claim 8, wherein when an entry in the value prediction storage that has linking information is invalidated, the linked entry is updated to remove the linking information within that linked entry.

11. An apparatus as claimed in claim 1, further comprising:
checking circuitry, responsive to execution by the processing circuitry of an instruction having an entry allocated in the value prediction storage, to check whether the generated result value matches the predicted result value;
wherein each entry in the value prediction storage is arranged to maintain a confidence indicator indicating a confidence in accuracy of the predicted result value stored in that entry, and wherein the confidence indicator is updated in dependence on the check performed by the checking circuitry each time the instruction allocated to that entry is executed.

12. An apparatus as claimed in claim 11, wherein when the checking circuitry detects that the generated result value matches the predicted result value the confidence indicator is adjusted to indicate a higher confidence in accuracy of the predicted result value, and when the checking circuitry detects that the generated result value does not match the predicted result value the confidence indicator is reset to an initial value.

13. An apparatus as claimed in claim 11, wherein:
at least the entry in the value prediction storage allocated for the first instruction is arranged to maintain a misprediction indicator that is updated in dependence on the check performed by the checking circuitry each time the first instruction is executed; and wherein the misprediction indicator is maintained as part of the confidence indicator.

14. An apparatus as claimed in claim 2, wherein the latency incurring instruction is at least one of a load instruction that misses in at least one cache, and a divide instruction.

15. An apparatus as claimed in claim 1, wherein following allocation of an entry in the value prediction storage to store a predicted result value for the identified dependent instruction, the allocation circuitry is responsive to a further trigger condition to identify a second dependent instruction whose result value will be dependent on the result value produced by the identified dependent instruction, and to allocate an entry in the value prediction storage to store a predicted result value for the second dependent instruction.

16. A method of operating an apparatus having processing circuitry to execute a sequence of instructions, and value prediction storage comprising a plurality of entries, where each entry is used to identify a predicted result value for an instruction allocated to that entry, the method comprising:

employing dispatch circuitry to maintain a record of pending instructions awaiting execution by the processing circuitry, and to select pending instructions from the record for dispatch to the processing circuitry for execution;

causing the dispatch circuitry to dispatch at least one pending instruction for speculative execution by the processing circuitry using as a source operand a predicted result value provided by the value prediction storage;

applying a default allocation policy to identify a first instruction to be allocated an entry in the value prediction storage; and responsive to a trigger condition, identifying a dependent instruction whose result value will be dependent on the result value produced by executing the first instruction, and allocating an entry in the value prediction storage to store a predicted result value for the identified dependent instruction.

17. An apparatus comprising:

processing means for executing a sequence of instructions;

value prediction storage means comprising a plurality of entries, each entry for identifying a predicted result value for an instruction allocated to that entry;

dispatch means for maintaining a record of pending instructions awaiting execution by the processing means, and for selecting pending instructions from the record for dispatch to the processing means for execution, the dispatch means being arranged to enable at least one pending instruction to be speculatively executed by the processing means using as a source operand a predicted result value provided by the value prediction storage means; and allocation means for applying a default allocation policy to identify a first instruction to be allocated an entry in the value prediction storage means;

the allocation means, responsive to a trigger condition, for identifying a dependent instruction whose result value will be dependent on the result value produced by executing the first instruction, and for allocating an entry in the value prediction storage means to store a predicted result value for the identified dependent instruction.

* * * * *